United States Patent
Sanchez et al.

(10) Patent No.: US 9,438,991 B2
(45) Date of Patent: *Sep. 6, 2016

(54) SOUND FEEDBACK SYSTEM FOR VEHICLES

(71) Applicant: DEERE & COMPANY, Moline, IL (US)

(72) Inventors: Julian Sanchez, Leclair, IA (US); Kristin J Sullivan, Des Moines, IA (US); Karl B Washburn, Leclaire, IA (US); Noel W Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/971,125

(22) Filed: Aug. 20, 2013

(65) Prior Publication Data

US 2015/0055794 A1    Feb. 26, 2015

(51) Int. Cl.
| | |
|---|---|
| H04B 1/00 | (2006.01) |
| H04R 29/00 | (2006.01) |
| H04R 3/00 | (2006.01) |
| G08G 1/16 | (2006.01) |
| B60R 16/023 | (2006.01) |
| B60W 50/08 | (2012.01) |
| A01B 69/00 | (2006.01) |

(52) U.S. Cl.
CPC ............... *H04R 3/00* (2013.01); *G08G 1/161* (2013.01); *A01B 69/00* (2013.01); *B60R 16/0231* (2013.01); *B60R 2300/00* (2013.01); *B60W 50/08* (2013.01); *B60W 2550/20* (2013.01); *H04R 2420/07* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 8,060,283 B2 | 11/2011 | Mott et al. | |
| 8,346,443 B2 | 1/2013 | Senneff et al. | |
| 8,352,112 B2 | 1/2013 | Mudalige | |
| 8,682,004 B2 | 3/2014 | Grigsby et al. | |
| 8,928,492 B2 * | 1/2015 | Boscacci | 340/902 |

(Continued)

FOREIGN PATENT DOCUMENTS

WO    2005116956 A2    12/2008

OTHER PUBLICATIONS

Lavrinc. Active Sound Design Enhances V8 Burble Inside BMW M5—Autoblog [Online], [retrieved Jul. 17, 2013], Retrieved from the Internet<URL:http://www.autoblog.com/2011/09/23/active-sound-design-enhances-v8-burble-inside-bmw-m5/>.

(Continued)

*Primary Examiner* — Andrew L Sniezek (57) ABSTRACT

A feedback system is configured for providing a feedback sound representative of a first vehicle sound of a first vehicle and a second vehicle sound of a second vehicle. The feedback system comprises a first vehicle data bus of the first vehicle and a second vehicle data bus of the second vehicle. A first wireless communication device communicates with the first vehicle data bus and is configured to communicate first vehicle sound. A second wireless communication device communicates with the second vehicle data bus and is configured to communicate second vehicle sound. An electronic data processing system comprises a third wireless communication device configured to receive the first and second vehicle sound. A sound integration module is configured to form or determine the feedback sound from the first and second vehicle sound. A sound generator module is configured to communicate the feedback sound to a user.

10 Claims, 6 Drawing Sheets

(56) References Cited

U.S. PATENT DOCUMENTS

| | | | |
|---|---|---|---|
| 2009/0177354 A1* | 7/2009 | Agrawal | G01M 17/007 701/33.4 |
| 2011/0118938 A1 | 5/2011 | MacDonald et al. | |
| 2011/0130905 A1* | 6/2011 | Mayer | G07C 5/008 701/22 |
| 2012/0010776 A1 | 1/2012 | Paturle | |
| 2013/0166157 A1 | 6/2013 | Schleicher et al. | |
| 2015/0054657 A1* | 2/2015 | Sanchez et al. | 340/902 |

OTHER PUBLICATIONS

Search Report and Written Opinion of the International Searching Authority. Issued in the Counterpart PCT Application No. PCT/US14/47802, Dated Nov. 25, 2014 (14 pages).

* cited by examiner

SOUND FEEDBACK SYSTEM FOR VEHICLES

FIELD OF THE DISCLOSURE

The present disclosure generally relates to a system and method for providing a feedback sound representative of one vehicle and another vehicle.

BACKGROUND OF THE DISCLOSURE

To provide feedback regarding one vehicle to another vehicle, certain prior art utilizes an imaging device and a monitor such that an operator can visually monitor an operational status of one vehicle from another vehicle.

SUMMARY OF THE DISCLOSURE

In one embodiment, a feedback system is disclosed. The feedback system is configured for providing a feedback sound representative of a first vehicle sound of a first vehicle and a second vehicle sound of a second vehicle. The feedback system comprises a first vehicle data bus of the first vehicle and a second vehicle data bus of the second vehicle. A first wireless communication device is in communication with the first vehicle data bus. The first wireless communication device is configured to communicate the first vehicle sound. A second wireless communication device is in communication with the second vehicle data bus. The second wireless communication device is configured to communicate second vehicle sound. An electronic data processing system comprising a third wireless communication device is configured to receive the first vehicle sound and the second vehicle sound. A sound integration module is configured to form or determine the feedback sound from the first vehicle sound and the second vehicle sound. A sound generator module is configured to communicate the feedback sound to a user.

In another embodiment, a feedback system is disclosed. The feedback system is configured for providing a feedback sound representative of a first vehicle sound of a first vehicle and a second vehicle sound of a second vehicle operating together in a work area. The feedback system comprises a first vehicle data bus of the first vehicle. A first wireless communication device is in communication with the first vehicle data bus. The first wireless communication device is configured to receive the second vehicle sound from a second wireless communication device of a second vehicle. In the first vehicle, an electronic data processing system is configured to receive the first vehicle sound and the second vehicle sound. A sound integration module is capable of forming or determining the feedback sound from the first vehicle sound and the second vehicle sound. A sound generator module is configured to communicate the feedback sound to a user.

In yet another embodiment, a method for providing a feedback sound representative of a first vehicle sound of a first vehicle and a second vehicle sound of a second vehicle is disclosed. The method comprises communicating the first vehicle sound and communicating the second vehicle sound. Receiving the first vehicle sound and the second vehicle sound. Forming or determining the feedback sound from the first vehicle sound and the second vehicle sound and communicating the feedback sound to a user.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
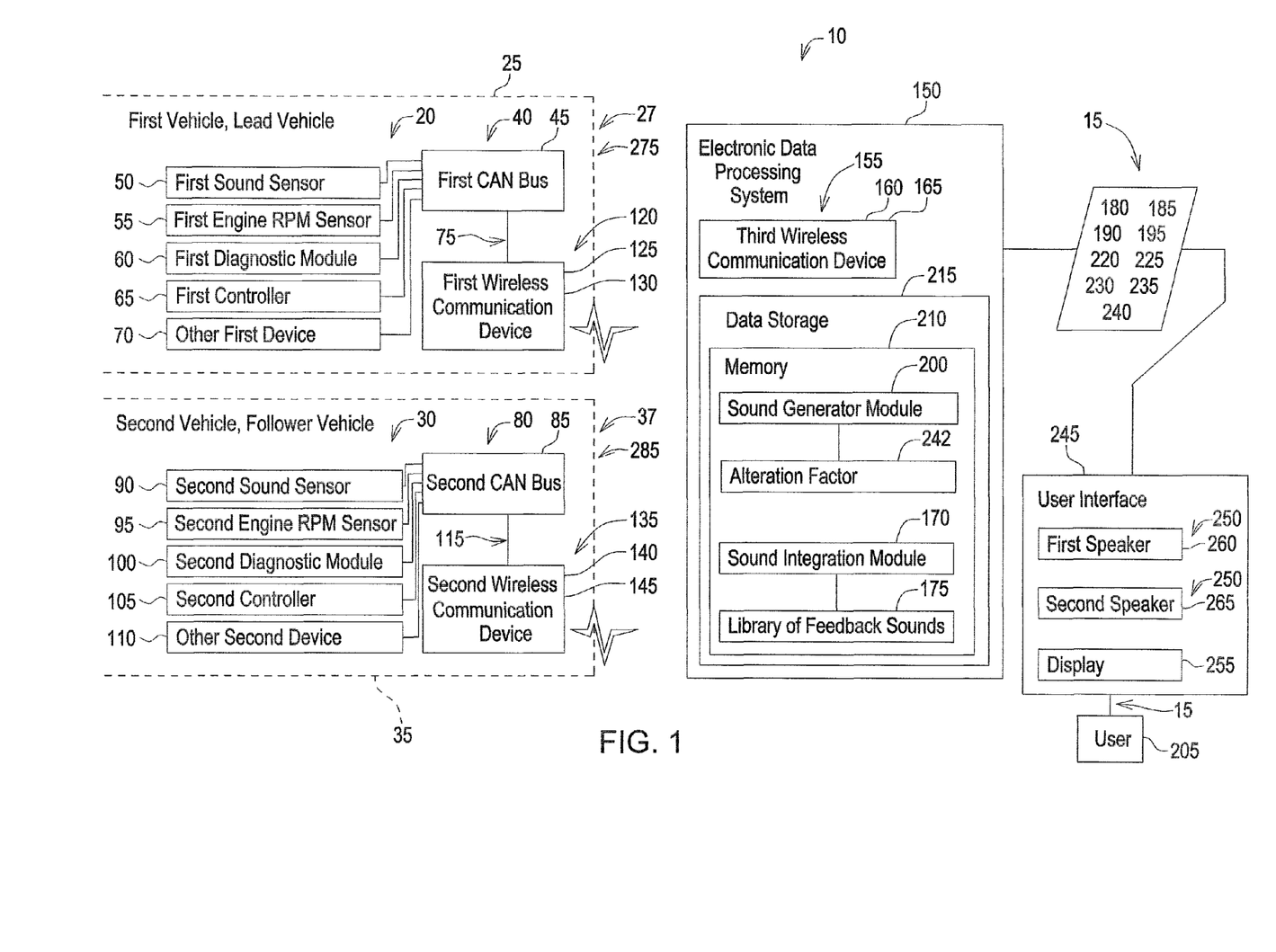
FIG. 1 is a schematic of a sound feedback system according to one embodiment.

FIGS. 1-6 illustrate various embodiments of a sound feedback system 10 for providing a feedback sound representative of a vehicle. With reference to FIG. 1, in one embodiment the illustrated sound feedback system 10 is configured for providing a feedback sound 15 representative of a first vehicle status 20 of a first vehicle electronics 25 of a first vehicle 27 (e.g., tractor, combine, construction vehicle) and a second vehicle status 30 of a second vehicle electronics 35 of a second vehicle 37 (e.g., tractor, combine, construction vehicle).

The sound feedback system 10 comprises a first vehicle data bus 40 of the first vehicle electronics 25. For example, the first vehicle data bus 40 may be a first CAN bus 45. A first sound sensor 50, or a first engine RPM sensor 55, a first diagnostic module 60, a first controller 65, or other first device 70 (e.g., engine controller, transmission controller, controller, other sensor, network element), may be in communication with the first vehicle data bus 40 to collect and provide first vehicle sound 75 (e.g., ambient sound, engine sound, combine separator).

For instance, the first diagnostic module 60 is capable of producing diagnostic codes, alarm data, warning data, trouble codes or status messages as the first vehicle sound 75. The first diagnostic module 60 may be configured to determine whether the first vehicle electronics 25 of the first vehicle 27 is operating properly.

The sound feedback system 10 comprises a second vehicle data bus 80 of the second vehicle electronics 35. For example, the second vehicle data bus 80 may be a second CAN bus 85. A second sound sensor 90, or a second engine RPM sensor 95, a second diagnostic module 100, a second controller 105, or other second device 110 (e.g., engine controller, transmission controller, controller, other sensor, network element), may be in communication with the second vehicle data bus 80 to collect and provide second vehicle sound 115 (e.g., ambient sound, engine sound, combine separator).

For instance, the second diagnostic module 100 is capable of producing diagnostic codes, alarm data, warning data, trouble codes or status messages as the second vehicle sound 115. The second diagnostic module 100 may be configured to determine whether the second vehicle electronics 35 of the second vehicle 37 is operating properly.

A first wireless communication device 120 is in communication with the first vehicle data bus 40. The first wireless communication device 120 is configured to communicate the first vehicle sound 75. The first wireless communication device 120 may be a first transceiver 125 or a first transmitter 130.

A second wireless communication device 135 is in communication with the second vehicle data bus 80. The second wireless communication device 135 is configured to communicate the second vehicle sound 115. The second wireless communication device 135 may be a second transceiver 140 or a second transmitter 145.

An electronic data processing system 150 is configured to receive the first vehicle sound 75 and the second vehicle sound 115 from the first vehicle data bus 40 and the second vehicle data bus 80 via the first wireless communication device 120 and the second wireless communication device 135, respectively. The electronic data processing system 150 may comprise a third wireless communication device 155 to communicate with the first wireless communication device 120 and the second wireless communication device 135. The third wireless communication device 155 may be a third transceiver 160 or a receiver 165.

In one embodiment, a sound integration module 170 comprises one or more amplifiers, attenuators, combiners, mixers, multipliers, frequency shifters, analog-to-digital converters, digital-to-analog converters, software emulators, software modules, or electronic modules for processing vehicle status data or vehicle sounds in the analog or digital domain. In one configuration, the sound integration module 170 is adapted to derive, form, or create synthetically-created sounds from one or both of the first vehicle status 20 and the second vehicle status 30, first vehicle sound 75, second vehicle sound 115, data diagnostic codes, alarm data, warning data, or trouble codes from one or both of the first vehicle electronics 25 and the second vehicle electronics 35, for example.

In an alternate configuration, the sound integration module 170 is capable of generating, combining (equally or weighted), mixing, amplifying, attenuating, frequency shifting, multiplying, creating (e.g., synthetically-derived or synthetically-created vehicle sounds), or processing sounds (e.g., recorded sounds) representative of an operational or functional status of the first vehicle electronics 25, the second vehicle electronics 35, or both.

The sound integration module 170 is configured to form or determine the feedback sound 15 from the first vehicle sound 75 and the second vehicle sound 115. The sound integration module 170 may match the first vehicle sound 75 and the second vehicle sound 115 to a library of feedback sounds 175 and communicate the feedback sound 15.

The sound integration module 170 may be configured to determine whether the first vehicle electronics 25 and the second vehicle electronics 35 are operating properly and form the feedback sound 15 as a dissonant chord 180 if at least one of the first vehicle electronics 25 and the second vehicle electronics 35 is not operating properly and form the feedback sound 15 as a major chord 185 if the first vehicle electronics 25 and the second vehicle electronics 35 are operating properly. The determination of whether the first vehicle electronics 25 and the second vehicle electronics 35 are operating properly may be determined by a threshold deviation between an expected and actual first vehicle sound 75 and second vehicle sound 115.

The sound integration module 170 may be configured to determine whether the first vehicle electronics 25 and the second vehicle electronics 35 are operating properly and form the feedback sound 15 in an amplified manner 190 if at least one of the first vehicle electronics 25 and the second vehicle electronics 35 is not operating properly and form the feedback sound 15 in a non-amplified manner 195 if the first vehicle electronics 25 and the second vehicle electronics 35 are operating properly.

A sound generator module 200 is configured to communicate the feedback sound 15 to a user 205. The sound integration module 170 and the sound generator module 200 may be separate electronic hardware modules or software included in a memory 210 of a data storage 215 of the electronic data processing system 150.

Alternatively, the sound generator module 200 may be configured to determine whether the first vehicle electronics 25 and the second vehicle electronics 35 are operating properly and generate a first tone 220 representative of the first vehicle sound 75 and a second tone 225 representative of the second vehicle sound 115. If at least one of the first vehicle electronics 25 and the second vehicle electronics 35 is not operating properly, the first tone 220 and the second tone 225 may be on different frequencies or spaced apart in the frequencies of a minor chord 230 or a dissonant sound 235. If the first vehicle electronics 25 and the second vehicle electronics 35 are operating properly, the first tone 220 and the second tone 225 may be on the same frequency or spaced on frequencies that form notes of the major chord 185. In addition, the feedback sound 15 may comprise a voice recording 240 if at least one of the first vehicle electronics 25 and the second vehicle electronics 35 is not operating properly. For example, the voice recording 240 may state "check engine" or other phrases.

Alternatively, if the first vehicle electronics 25 of the first vehicle 27 is not operating properly, the sound generator module 200 may form the feedback sound 15 to more closely approximate a sound representative of the first vehicle sound 75. If the second vehicle electronics 35 of the second vehicle 37 is not operating properly, the sound generator module 200 may form the feedback sound 15 to more closely approximate a sound representative of the second vehicle sound 115.

In another embodiment, if at least one of the first vehicle electronics 25 and the second vehicle electronics 35 is not operating properly, the sound generator module 200 is configured to form the feedback sound 15 in the amplified manner 190. However, if the first vehicle electronics 25 and the second vehicle electronics 35 are operating properly, the sound generator module 200 is configured to form the feedback sound 15 in the non-amplified manner 195.

Alternatively, if the first vehicle electronics 25 of the first vehicle 27 is not operating properly, the sound generator module 200 may form the feedback sound 15 from the first vehicle sound 75 modified by an alteration factor 242 (e.g., altering a sound amplification factor, altering a sound frequency offset, altering a sound frequency multiplier, changing the shape of a waveform by a mathematical function, substituting a sound, or substituting speech) and the second vehicle sound 115. If the second vehicle electronics 35 of the second vehicle 37 is not operating properly, the sound generator module 200 may form the feedback sound 15 from the first vehicle sound 75 and the second vehicle sound 115 modified by the alteration factor 242.

A user interface 245 comprising a speaker 250 may be in communication with the sound generator module 200. The user interface 245 is configured to communicate the feedback sound 15 through the speaker 250. The user interface 245 may provide additional detail on a display 255 (e.g., LCD screen).

Alternatively, the user interface 245 may comprise a first speaker 260 and a second speaker 265. The user interface 245 may be configured to communicate the feedback sound 15 representative of the first vehicle status 20 of the first vehicle electronics 25 primarily through the first speaker 260 and the feedback sound 15 representative of the second vehicle status 30 of the second vehicle electronics 35 primarily through the second speaker 265. This enables a stereo effect, where an illusion of directionality and audible perspective is provided, when the first vehicle electronics 25 and the second vehicle electronics 35 are positioned left and right of one another, the first speaker 260 and the second speaker 265 are positioned left and right of one another, and the feedback sound 15 representative of the vehicle on the left is communicated primarily through the speaker on the left and the feedback sound 15 representative of the vehicle on the right is communicated primarily through the speaker on the right, depending on the relative position of the first vehicle electronics 25 and the second vehicle electronics 35. Once the first vehicle electronics 25 and the second vehicle electronics 35 are positioned adjacent one another, the feedback sound 15 representative of the vehicle on the left and the vehicle on the right may be the same in the first speaker 260 and the second speaker 265. The stereo effect is also possible when the first vehicle electronics 25 and the second vehicle electronics 35 are positioned front and rear of one another, the first speaker 260 and the second speaker 265 are positioned front and rear of one another, and the feedback sound 15 representative of the vehicle in the front is communicated primarily through the speaker in the front and the feedback sound 15 representative of the vehicle in the rear is communicated primarily through the speaker in the rear, depending on the relative position of the first vehicle electronics 25 and the second vehicle electronics 35. Once the first vehicle electronics 25 and the second vehicle electronics 35 are positioned adjacent one another, the feedback sound 15 representative of the vehicle in front and the vehicle in the rear may be the same in the first speaker 260 and the second speaker 265. Other vehicle and speaker configurations are contemplated by this disclosure.

Figure 2:
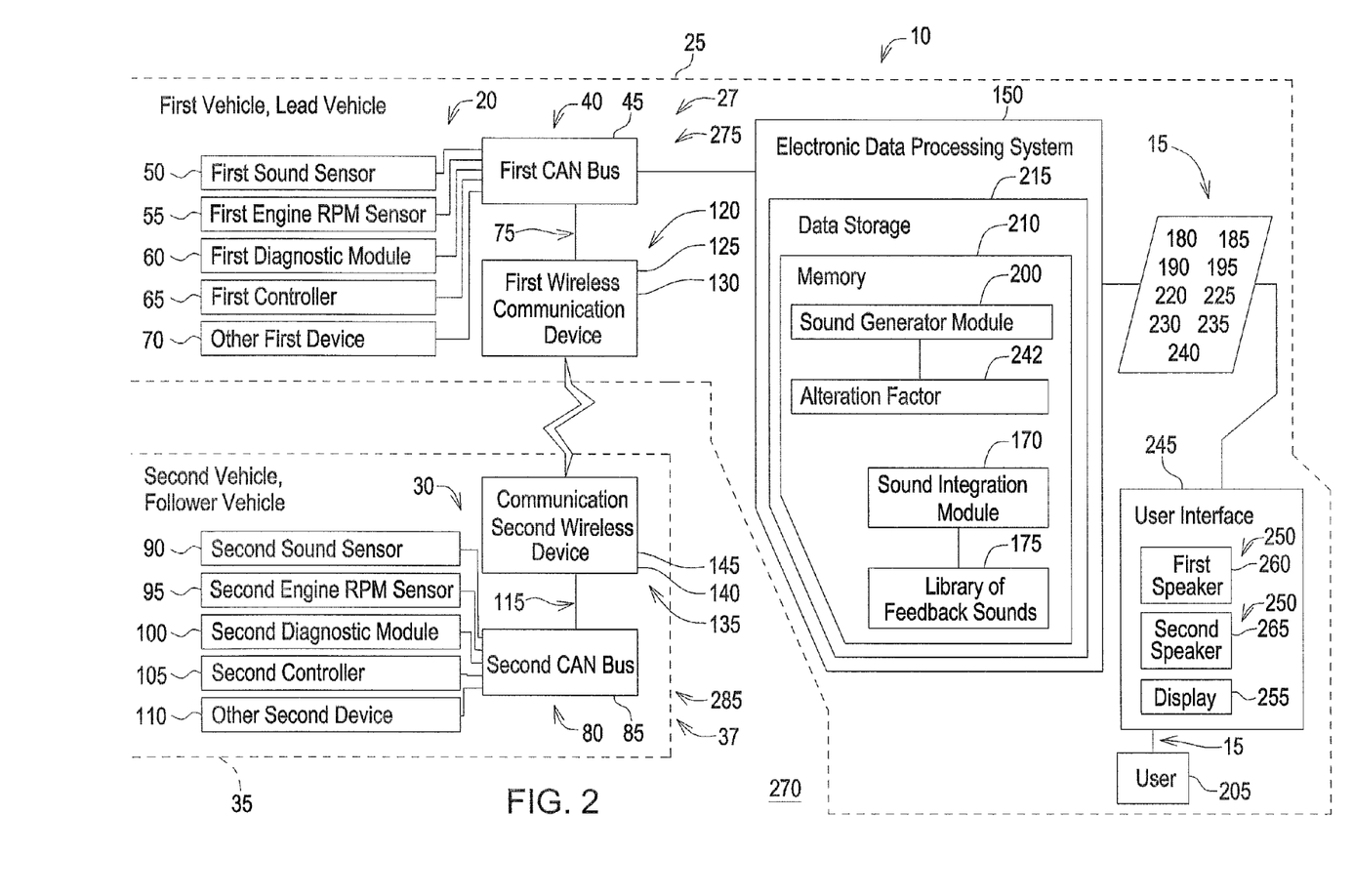
FIG. 2 is a schematic of a sound feedback system according to another embodiment.

Referring to FIG. 2, in another embodiment, the illustrated feedback system 10 is configured for providing the feedback sound 15 representative of the first vehicle status 20 of the first vehicle electronics 25 (e.g., tractor, combine, construction vehicle) and the second vehicle status 30 of the second vehicle electronics 35 (e.g., tractor, combine, construction vehicle) working together in a work area 270. The feedback system 10 of FIG. 2 is similar to the feedback system 10 of FIG. 1, except that the feedback sound 15 is provided to a user 205 of the first vehicle 27, such as within a cab or at the user interface 245 of the first vehicle 27. Like reference numbers in FIG. 1 and FIG. 2 indicate like elements.

The feedback system 10 comprises the first vehicle data bus 40 of the first vehicle electronics 25. The first wireless communication device 120 is in communication with the first vehicle data bus 40. The first wireless communication device 120 is configured to receive second vehicle sound 115 from the second wireless communication device 135 of the second vehicle electronics 35. In the first vehicle electronics 25, the electronic data processing system 150 is configured to receive the first vehicle sound 75 and the second vehicle sound 115. The sound integration module 170 is capable of forming or determining the feedback sound 15 from the first vehicle sound 75 and the second vehicle sound 115. The sound generator module 200 is configured to communicate the feedback sound 15 to the user 205.

Figure 3:
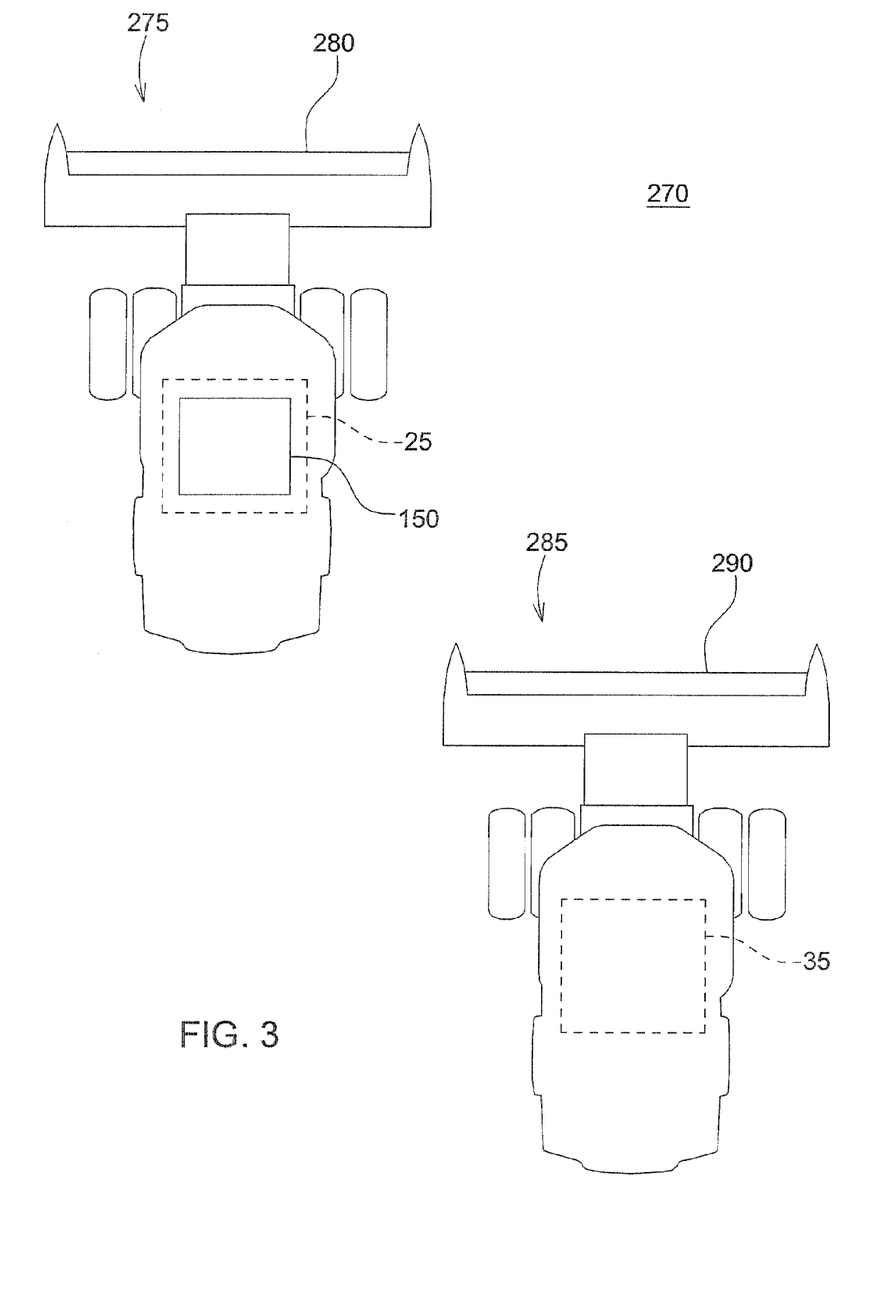
FIG. 3 is a plan view of a first vehicle and a second vehicle incorporating the sound feedback system of FIG. 1 or 2.

With reference to FIG. 3, the first vehicle electronics 25 may be supported on a lead vehicle 275 (e.g., combine). The lead vehicle 275 may comprise a lead implement 280 (e.g., header). The second vehicle electronics 35 may be supported on a follower vehicle 285 (e.g., combine) configured to follow the lead vehicle 275. The follower vehicle 285 may comprise a follower implement 290 (e.g., header). It is contemplated that the lead vehicle 275 may operate in front of, behind, to the left, or to the right of the follower vehicle 280. The electronic data processing system 150 may be coupled to the lead vehicle 275. The first vehicle sound 75 (FIG. 2) may pertain to the lead implement 280. The second vehicle sound 115 (FIG. 2) may pertain to the follower implement 290.

Figure 4:
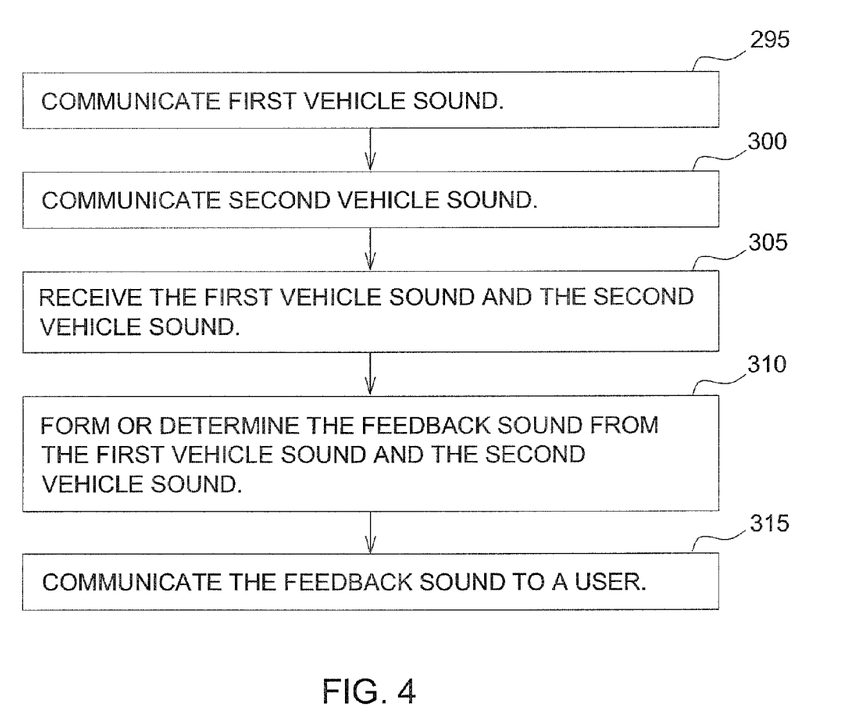
FIG. 4 is a flow chart of the steps of the method for providing sound feedback to a user or manager of one or more vehicles according to one embodiment.

Referring to FIG. 4, a flow chart of the steps of the method for providing sound feedback to a user or manager of one or more vehicles is disclosed according to one embodiment. In step 295, the first vehicle sound 75 is communicated. In step 300, the second vehicle sound 115 is communicated. In step 305, the first vehicle sound 75 and the second vehicle sound 115 are received by an electronic data processing system 150. In step 310, the feedback sound 15 is formed or determined from the first vehicle sound 75 and the second vehicle sound 115 by a sound integration module 170. In step 315, the feedback sound 15 is communicated to a user 205.

Figure 5:
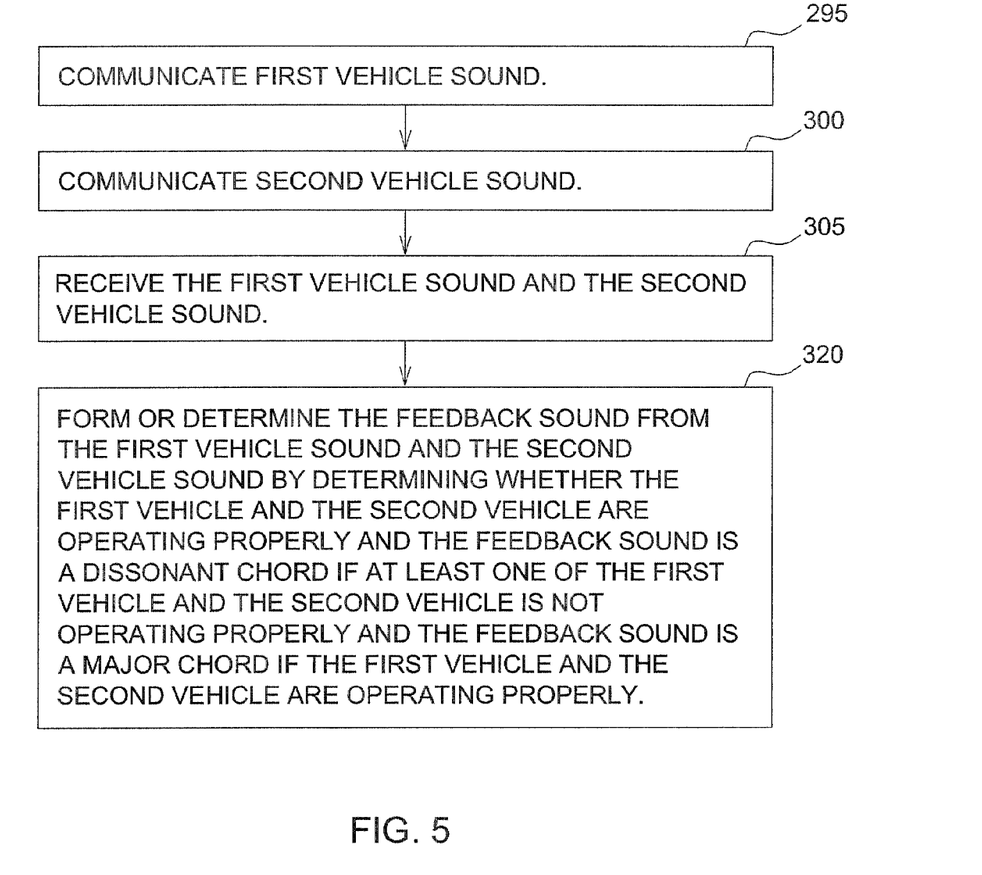
FIG. 5 is a flow chart of the steps of the method for providing sound feedback to a user or manager of one or more vehicles according to another embodiment.

With reference to FIG. 5, a flow chart of the steps of the method for providing sound feedback to a user or manager of one or more vehicles is disclosed according to another embodiment. In step 295, the first vehicle sound 75 is communicated. In step 300, the second vehicle sound 115 is communicated. In step 305, the first vehicle sound 75 and the second vehicle sound 115 are received by an electronic data processing system 150. In step 320, the feedback sound 15 is formed or determined from the first vehicle sound 75 and the second vehicle sound 115 by determining whether the first vehicle 27 and the second vehicle 37 are operating properly. The feedback sound 15 is a dissonant chord 180 if at least one of the first vehicle 27 and the second vehicle 37 is not operating properly. The feedback sound 15 is a major chord 185 if the first vehicle 27 and the second vehicle 37 are operating properly.

Figure 6:
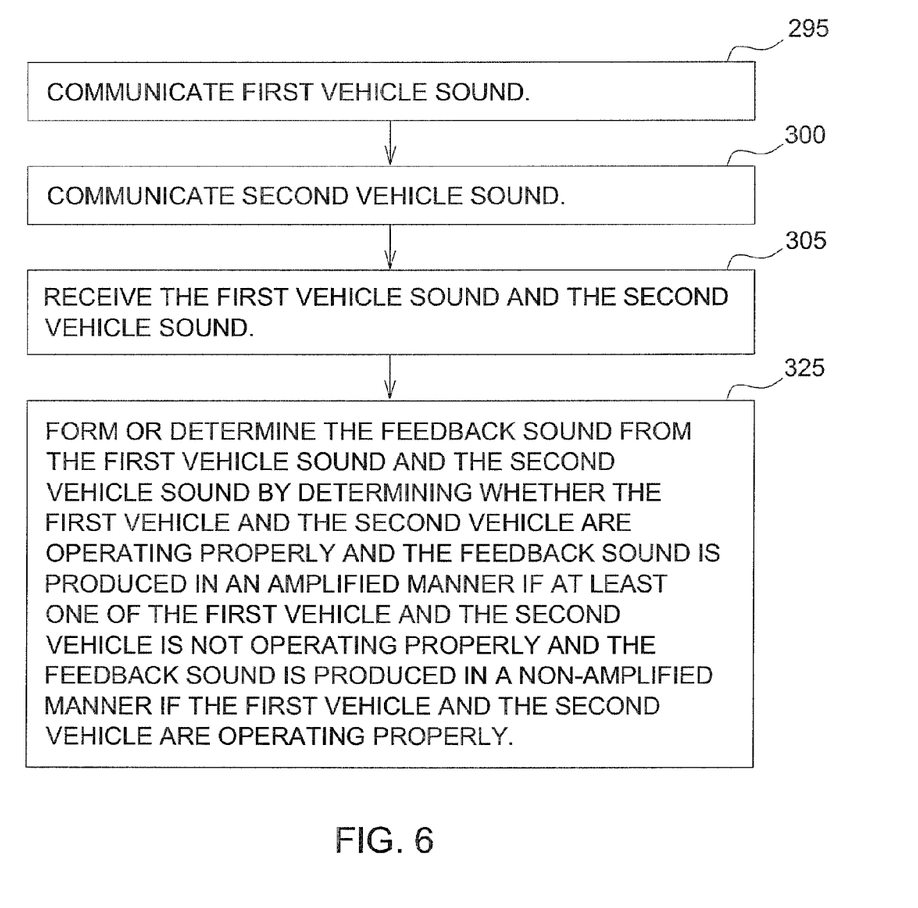
FIG. 6 is a flow chart of the steps of the method for providing sound feedback to a user or manager of one or more vehicles according to yet another embodiment.

Referring to FIG. 6, a flow chart of the steps of the method for providing sound feedback to a user or manager of one or more vehicles is disclosed according to yet another embodiment. In step 295, the first vehicle sound 75 is communicated. In step 300, the second vehicle sound 115 is communicated. In step 305, the first vehicle sound 75 and the second vehicle sound 115 are received by an electronic data processing system 150. In step 325, the feedback sound 15 is formed or determined from the first vehicle sound 75 and the second vehicle sound 115 by determining whether the first vehicle 27 and the second vehicle 37 are operating properly. The feedback sound 15 is produced in an amplified manner 190 if at least one of the first vehicle 27 and the second vehicle 37 is not operating properly. The feedback sound 15 is produced in a non-amplified manner 195 if the first vehicle 27 and the second vehicle 37 are operating properly.

Advantageously, the feedback system 10 enables the user 205 to react more quickly to changing conditions by listening for the feedback sound 15. This saves fuel, prevents damage to the first vehicle 27 and the second vehicle 37, and provides other benefits.

Various features are set forth in the following claims.

What is claimed is:

1. A feedback system configured for providing a feedback sound representative of a first vehicle sound of a first vehicle and a second vehicle sound of a second vehicle, the feedback system comprising:
    the first vehicle sound being at least one of an ambient sound, an engine sound or a combine separator sound;
    the second vehicle sound being at least one of an ambient sound, an engine sound or a combine separator sound
    a first vehicle data bus of the first vehicle;
    a second vehicle data bus of the second vehicle;
    a first wireless communication device in communication with the first vehicle data bus, the first wireless communication device configured to communicate the first vehicle sound;
    a second wireless communication device in communication with the second vehicle data bus, the second wireless communication device configured to communicate the second vehicle sound;
    an electronic data processing system comprising a third wireless communication device configured to receive the first vehicle sound and the second vehicle sound;
    a sound integration module configured to form or determine the feedback sound from the first vehicle sound and the second vehicle sound;
    a user interface located one of: in the first vehicle, in the second vehicle or outside the first and second vehicles; and
    a sound generator module configured to communicate the feedback sound to the user interface and thus to a user located with the user interface;
wherein the user interface comprises a first speaker and a second speaker and is configured to communicate the first vehicle sound primarily through the first speaker and the second vehicle sound primarily through the second speaker.

2. A feedback system configured for providing a feedback sound representative of a first vehicle sound of a first vehicle and a second vehicle sound of a second vehicle, the feedback system comprising:
    a first vehicle data bus of the first vehicle;
    a second vehicle data bus of the second vehicle;
    a first wireless communication device in communication with the first vehicle data bus, the first wireless communication device configured to communicate the first vehicle sound;
    a second wireless communication device in communication with the second vehicle data bus, the second wireless communication device configured to communicate the second vehicle sound;
    an electronic data processing system comprising a third wireless communication device configured to receive the first vehicle sound and the second vehicle sound;
    a sound integration module configured to form or determine the feedback sound from the first vehicle sound and the second vehicle sound;
    a user interface located one of: in a first vehicle, in a second vehicle or outside the first and second vehicles;
    a sound generator module configured to communicate the feedback sound to the user interface and thus to a user located with the user interface; and
    wherein the feedback sound comprises the first vehicle sound and the second vehicle sound weighted equally in amplitude and wherein the first vehicle sound or the second vehicle sound is shifted in frequency such that the user can hear both sounds simultaneously.

3. A feedback system configured for providing a feedback sound representative of a first vehicle sound of a first vehicle and a second vehicle sound of a second vehicle, the feedback system comprising:
    a first vehicle data bus of the first vehicle;
    a second vehicle data bus of the second vehicle;
    a first wireless communication device in communication with the first vehicle data bus, the first wireless communication device configured to communicate the first vehicle sound;
    a second wireless communication device in communication with the second vehicle data bus, the second wireless communication device configured to communicate the second vehicle sound;
    an electronic data processing system comprising a third wireless communication device configured to receive the first vehicle sound and the second vehicle sound;
    a sound integration module configured to form or determine the feedback sound from the first vehicle sound and the second vehicle sound;
    a user interface located at one of: in the first vehicle, in the second vehicle or outside the first and second vehicles;
    a sound generator module configured to communicate the feedback sound to the user interface and thus to a user located with the user interface, and
    wherein a first diagnostic module, coupled to the first vehicle data bus, is configured to determine whether the first vehicle is operating properly and a second diagnostic module, coupled to the second vehicle data bus, is configured to determine whether the second vehicle is operating properly and if the first vehicle is not operating properly, the sound generator is adapted to form the feedback sound to more closely approximate the first vehicle sound, and if the second vehicle is not operating properly, the feedback sound is formed to more closely approximate the second vehicle sound.

4. A feedback system configured for providing a feedback sound representative of a first vehicle sound of a first vehicle and a second vehicle sound of a second vehicle, the feedback system comprising:
    a first vehicle data bus of the first vehicle;
    a second vehicle data bus of the second vehicle;
    a first wireless communication device in communication with the first vehicle data bus, the first wireless communication device configured to communicate the first vehicle sound;
    a second wireless communication device in communication with the second vehicle data bus, the second wireless communication device configured to communicate the second vehicle sound;
    an electronic data processing system comprising a third wireless communication device configured to receive the first vehicle sound and the second vehicle sound;
    a sound integration module configured to form or determine the feedback sound from the first vehicle sound and the second vehicle sound;
    a user interface located one of: in the first vehicle, in the second vehicle or outside the first and second vehicles;
    a sound generator module configured to communicate the feedback sound to the user interface and to a user located with the user interface; and
    wherein the sound generator module is configured to determine whether the first vehicle and the second vehicle are operating properly and the feedback sound is amplified if at least one of the first vehicle and the second vehicle is not operating properly and the feedback sound is not amplified if the first vehicle and the second vehicle are operating properly.

5. A feedback system configured for providing a feedback sound representative of a first vehicle sound of a first vehicle and a second vehicle sound of a second vehicle, the feedback system comprising:
 a first vehicle data bus of the first vehicle;
 a second vehicle data bus of the second vehicle;
 a first wireless communication device in communication with the first vehicle data bus, the first wireless communication device configured to communicate the first vehicle sound;
 a second wireless communication device in communication with the second vehicle data bus, the second wireless communication device configured to communicate the second vehicle sound;
 an electronic data processing system comprising a third wireless communication device configured to receive the first vehicle sound and the second vehicle sound;
 a sound integration module configured to form or determine the feedback sound from the first vehicle sound and the second vehicle sound;
 a user interface located one of: in the first vehicle, in the second vehicle or outside the first and second vehicles; and
 a sound generator module configured to communicate the feedback sound to the user interface and to a user located with the user interface and
 wherein the sound generator module is configured to determine whether the first vehicle and the second vehicle are operating properly and if the first vehicle is not operating properly, the feedback sound comprises the first vehicle sound modified by an alteration factor and the second vehicle sound, and if the second vehicle is not operating properly, the feedback sound comprises the second vehicle sound modified by the alteration factor and the first vehicle sound.

6. A feedback system configured for providing a feedback sound representative of a first vehicle sound of a first vehicle and a second vehicle sound of a second vehicle operating together in a work area, the feedback system comprising:
 a first vehicle data bus of the first vehicle;
 a first wireless communication device of the first vehicle being in communication with the first vehicle data bus, the first wireless communication device configured to receive the second vehicle sound from a second wireless communication device of the second vehicle;
 an electronic data processing system being in the first vehicle and configured to receive the first vehicle sound and the second vehicle sound;
 a sound integration module capable of forming or determining the feedback sound from the first vehicle sound and the second vehicle sound;
 a user interface located one of: in the first vehicle, in the second vehicle or outside the first and second vehicles;
 a sound generator module configured to communicate the feedback sound to the user interface and thus to a user located with the user interface; and,
 wherein a first diagnostic module, coupled to the first vehicle data bus, is configured to determine whether the first vehicle is operating properly and a second diagnostic module, coupled to a second vehicle data bus, is configured to determine whether the second vehicle is operating properly and if the first vehicle is not operating properly, the sound generator is adapted to form the feedback sound to more closely approximate the first vehicle sound, and if the second vehicle is not operating properly, the feedback sound is formed to more closely approximate the second vehicle sound.

7. A feedback system configured for providing a feedback sound representative of a first vehicle sound of a first vehicle and a second vehicle sound of a second vehicle operating together in a work area, the feedback system comprising:
 the first vehicle sound being at least one of an ambient sound, an engine sound or a combine separator sound;
 the second vehicle sound being at least one of an ambient sound, an engine sound or a combine separator sound
 a first vehicle data bus of the first vehicle;
 a first wireless communication device in communication with the first vehicle data bus, the first wireless communication device being configured to receive the second vehicle sound from a second wireless communication device of the second vehicle;
 an electronic data processing system being located in the first vehicle and configured to receive the first vehicle operating sound and the second vehicle operating sound;
 a sound integration module capable of forming or determining the feedback sound from the first vehicle sound and the second vehicle sound;
 a user interface located one of: in the first vehicle, the second vehicle or outside the first and second vehicles; and
 a sound generator module configured to communicate the feedback sound to the user interface and thus to a user located with the user interface;
 wherein the sound generator module is configured to determine whether the first vehicle and the second vehicle are operating properly and the feedback sound is amplified if at least one of the first vehicle and the second vehicle is not operating properly and the feedback sound is not amplified if the first vehicle and the second vehicle are operating properly.

8. A feedback system configured for providing a feedback sound representative of a first vehicle sound of a first vehicle and a second vehicle sound of a second vehicle operating together in a work area, the feedback system comprising:
 a first vehicle data bus of the first vehicle;
 a first wireless communication device in communication with the first vehicle data bus, the first wireless communication device being configured to receive the second vehicle sound from a second wireless communication device of the second vehicle;
 an electronic data processing system being located in the first vehicle and configured to receive the first vehicle operating sound and the second vehicle operating sound;
 a sound integration module capable of forming or determining the feedback sound from the first vehicle sound and the second vehicle sound;
 a user interface located one of: in the first vehicle, the second vehicle or outside the first and second vehicles;
 a sound generator module configured to communicate the feedback sound to the user interface and thus to a user located with the user interface; and
 wherein the sound generator module is configured to determine whether the first vehicle and the second vehicle are operating properly and if the first vehicle is not operating properly, the feedback sound comprises the first vehicle sound modified by an alteration factor and the second vehicle sound, and if the second vehicle is not operating properly, the feedback sound comprises the second vehicle sound modified by the alteration factor and the first vehicle sound.

9. A feedback system configured for providing a feedback sound representative of a first vehicle sound of a first vehicle and a second vehicle sound of a second vehicle operating together in a work area, the feedback system comprising:
- a first vehicle data bus of the first vehicle;
- a first wireless communication device in communication with the first vehicle data bus, the first wireless communication device being configured to receive the second vehicle sound from a second wireless communication device of the second vehicle;
- an electronic data processing system being located in the first vehicle and configured to receive the first vehicle operating sound and the second vehicle operating sound;
- a sound integration module capable of forming or determining the feedback sound from the first vehicle sound and the second vehicle sound;
- a user interface located one of: in the first vehicle, the second vehicle or outside the first and second vehicles;
- a sound generator module configured to communicate the feedback sound to the user interface and thus to a user located with the user interface; and further wherein the user interface comprises a first speaker and a second speaker and is configured to communicate the feedback sound representative of the first vehicle sound primarily through the first speaker and the feedback sound representative of the second vehicle sound primarily through the second speaker.

10. A method for providing a feedback sound representative of a first vehicle sound of a first vehicle and a second vehicle sound of a second vehicle, the method comprising:
- communicating the first vehicle sound;
- communicating the second vehicle sound;
- receiving the first vehicle sound and the second vehicle sound;
- forming or determining the feedback sound from the first vehicle sound and the second vehicle sound;
- communicating the feedback sound to a user interface located together with a user at a location one of: in the first vehicle, in the second vehicle or outside the first and second vehicles; and
- determining whether the first vehicle and the second vehicle are operating properly and if the first vehicle is not operating properly, amplifying the first vehicle sound, and if the second vehicle is not operating properly, amplifying the second vehicle sound.

* * * * *